United States Patent
Michaelis, IV et al.

(10) Patent No.: US 10,367,447 B2
(45) Date of Patent: Jul. 30, 2019

(54) LIGHTER-THAN-AIR AIRCRAFT AND METHOD TO REDUCE LEAKAGE WITHIN A FLEXIBLE BLADDER

(71) Applicant: Skycom Corporation, Austin, TX (US)

(72) Inventors: Max G. Michaelis, IV, Kyle, TX (US); John H. H. Bennett, Austin, TX (US)

(73) Assignee: SKYCOM CORPORATION, Austin, TX (US)

( * ) Notice: Subject to any disclaimer, the term of this patent is extended or adjusted under 35 U.S.C. 154(b) by 341 days.

(21) Appl. No.: 14/971,651

(22) Filed: Dec. 16, 2015

(65) Prior Publication Data

US 2017/0179871 A1 Jun. 22, 2017

(51) Int. Cl.
*B64B 1/58* (2006.01)
*H02S 20/32* (2014.01)
(Continued)

(52) U.S. Cl.
CPC ............... *H02S 20/32* (2014.12); *B64B 1/58* (2013.01); *B64B 1/62* (2013.01); *H02S 10/40* (2014.12);
(Continued)

(58) Field of Classification Search
CPC .......... H02S 20/32; H02S 10/40; H02S 30/20; H01Q 1/28–30; B64B 1/58; B64B 1/62;
(Continued)

(56) References Cited

U.S. PATENT DOCUMENTS 1,027,590 A * 5/1912 Bucher ............... B64B 1/00
244/30
1,451,503 A * 4/1923 Goetz ............... B64B 1/58
244/127
(Continued)

FOREIGN PATENT DOCUMENTS

GB 267473 8/1927
WO 2011/042316 4/2011

OTHER PUBLICATIONS

Wikipedia, "Wi-Fi", https://en.wikipedia.org/wiki/Wi-Fi; accessed Oct. 1, 2017.*

(Continued)

*Primary Examiner* — Philip J Bonzell
*Assistant Examiner* — Alexander V. Giczy
(74) *Attorney, Agent, or Firm* — Jackson Walker L.L.P.

(57) ABSTRACT

An unmanned lighter-than-air aircraft includes an outer membrane, a flexible bladder within the outer membrane and containing a lighter-than-air gas, a region disposed between the outer membrane and flexible bladder, a volume detection device configured to measure the volume of the flexible bladder, a pressure adjustment device to adjust the pressure within the region, and pressure control circuitry to control the region pressure adjustment device based on measurements from the volume detection device. The aircraft is maintained at a desired altitude, and the volume of the flexible bladder is measured. The pressure within the region is then adjusted by the pressure control circuitry to maintain the volume of the flexible bladder at a desired (Continued)

volume less than its maximum volume, equalizing its pressure with that of the region to reduce lighter-than-air gas leakage from the flexible bladder.

19 Claims, 13 Drawing Sheets

(51) Int. Cl.
    *H02S 10/40*     (2014.01)
    *B64B 1/62*     (2006.01)
    *H02S 30/20*     (2014.01)

(52) U.S. Cl.
    CPC ........ *H02S 30/20* (2014.12); *B64C 2201/022* (2013.01); *B64C 2201/122* (2013.01); *B64C 2201/208* (2013.01)

(58) Field of Classification Search
    CPC .... B64B 1/02; B64B 1/06; B64B 1/24; B64B 1/40
    USPC ...................................................... 244/53 R
    See application file for complete search history.

(56) References Cited

U.S. PATENT DOCUMENTS

| | | | | |
|---|---|---|---|---|
| 2,740,598 | A * | 4/1956 | Krevelen | B64B 1/40 244/96 |
| 3,151,824 | A * | 10/1964 | Struble, Jr. | B64B 1/62 244/31 |
| 3,221,549 | A * | 12/1965 | Wetmore | B64D 43/02 235/61 NV |
| 3,742,358 | A | 6/1973 | Cesaro | |
| 3,781,894 | A | 12/1973 | Ancona et al. | |
| 3,970,270 | A * | 7/1976 | Pittet, Jr. | B64B 1/08 244/125 |
| 6,173,741 | B1 * | 1/2001 | Nickel | B60K 15/03519 123/510 |
| 6,286,783 | B1 * | 9/2001 | Kuenkler | B63H 5/125 244/26 |
| 6,382,557 | B1 * | 5/2002 | Lafuma | B64B 1/00 244/12.2 |
| 6,581,873 | B2 | 6/2003 | McDermott | |
| 8,336,810 | B2 * | 12/2012 | Brutoco | B64B 1/06 137/899.2 |
| 8,820,678 | B2 | 9/2014 | DeVaul et al. | |
| 9,016,622 | B1 * | 4/2015 | Pasternak | B64B 1/62 244/97 |
| 9,033,274 | B2 | 5/2015 | DeVaul et al. | |
| 9,067,666 | B1 | 6/2015 | Roach et al. | |
| 9,105,970 | B1 | 8/2015 | Heinrich | |
| 9,153,854 | B1 | 10/2015 | Biffle et al. | |
| 9,281,554 | B1 * | 3/2016 | Behroozi | H01Q 1/28 |
| 9,340,272 | B1 * | 5/2016 | DeVaul | B64B 1/62 |
| 9,475,567 | B1 * | 10/2016 | Roach | B64B 1/58 |
| 2006/0000945 | A1 * | 1/2006 | Voss | B64B 1/60 244/97 |
| 2006/0065777 | A1 * | 3/2006 | Walden | B64B 1/60 244/97 |
| 2007/0069077 | A1 * | 3/2007 | Colting | B64B 1/30 244/128 |
| 2007/0295859 | A1 * | 12/2007 | Colvin | B64B 1/06 244/24 |
| 2008/0179454 | A1 * | 7/2008 | Balaskovic | B64B 1/06 244/30 |
| 2009/0230237 | A1 * | 9/2009 | Tillotson | F24J 2/38 244/30 |
| 2009/0294576 | A1 * | 12/2009 | LaForge | H01M 8/0656 244/30 |
| 2010/0320314 | A1 * | 12/2010 | Balaskovic | B64B 1/34 244/96 |
| 2012/0018571 | A1 * | 1/2012 | Goelet | B64B 1/005 244/30 |
| 2013/0177322 | A1 | 7/2013 | DeVaul et al. | |
| 2014/0048646 | A1 * | 2/2014 | DeVaul | B64B 1/40 244/97 |
| 2014/0158823 | A1 * | 6/2014 | Smith | B64B 1/44 244/1 A |
| 2015/0076279 | A1 * | 3/2015 | Nelson | B64B 1/10 244/30 |
| 2015/0111601 | A1 | 4/2015 | Fagan | |
| 2015/0248711 | A1 | 9/2015 | Fournier et al. | |
| 2017/0150373 | A1 * | 5/2017 | Brennan | H04W 16/28 |

OTHER PUBLICATIONS

Wikipedia, "3G", https://en.wikipedia.org/wiki/3G; accessed Oct. 1, 2017.*
Wikipedia, "LTE (telecommunication)", https://en.wikipedia.org/wiki/LTE_(telecommunication); accessed Oct. 1, 2017.*
Pressure transducer. (n.d.) McGraw-Hill Concise Encyclopedia of Physics. (2002). Retrieved Oct. 15, 2018 from https://encyclopedia2.thefreedictionary.com/pressure+transducer (Year: 2002).*
Gabriel Alexander Khoury, ed. Airship Technology. Cambridge University Press, Feb. 13, 2012; p. 131 (Year: 2012).*
Wikipedia, "Superpressure balloon", https://en.wikipedia.org/wiki/Superpressure_balloon, accessed Dec. 21, 2018 (Year: 2018).*
Kim Aaron, "What is a super pressure balloon? How does it work?" in Quora.com; May 29, 2016; https://www.quora.com/What-is-a-super-pressure-balloon-How-does-it-work, accessed Dec. 21, 2018 (Year: 2018).*
International Search Report and Written Opinion in PCT Application No. PCT/US2016/060146 dated Mar. 8, 2017, 10 pages.
R. Anderson, et al., "GAINS Instrumentation," AIAA-99-3869, American Institute of Aeronautics & Astronautics, 1999, pp. 169-179.
Cecilia M.I.R., et al., "Global Air-Ocean IN-SITU System (GAINS);" Proceedings 14th ESA Symposium on European Rocket & Balloon Programmes and Related Research, May 31-Jun. 3, 1999 (ESA SP-437, Sep. 1999), pp. 241-246.
Tim Lachenmeier, et al, "A New Long Duration Variable-Density Superpressure Balloon Platform," A99-33321, American Institute of Aeronautics & Astronautics, 1999, pp. 190-196.
Alvaro Valcarce, et al., "Airborne Base Stations for Emergency and Temporary Events," submitted on Jul. 11, 2013, 5th International ICST Conference, PSATS 2013, Toulouse, France, Jun. 27-28, 2013, 12 pages.
J. Thornton, et al., "Broadband Communications from a High-Altitude Platform: The European HeliNet Programme," Electronics & Communication Engineering Journal, Jun. 2001, pp. 138-144.
Saeed H. Alsamhi, et al., "An Intelligent HAP for Broadband Wireless Communications: Developments, QoS and Applications," International Journal of Electronics and Electrical Engineering vol. 3, No. 2, Apr. 2015, pp. 134-143.
David Jefferies, "Broadband by Balloon," antenneX Online Issue No. 105, Jan. 2006, 6 pages.
Laurent Reynaud, et al., "Deployable Aerial Communication Networks: challenges for futuristic applications," Proceedings of the 9th ACM symposium on Performance evaluation of wireless ad hoc, sensor, and ubiquitous networks, 2012, 9 pages.

* cited by examiner

LIGHTER-THAN-AIR AIRCRAFT AND METHOD TO REDUCE LEAKAGE WITHIN A FLEXIBLE BLADDER

BACKGROUND

Technical Field

This disclosure relates to lighter-than-air platforms. In particular, this disclosure has applications in the field of unmanned lighter-than-air platforms that can be used for various purposes, such as supporting telecommunications equipment, deploying aerial scientific equipment, etc. In various embodiments, such lighter-than-air platforms may be realized as drones, balloons, airships, or any other suitable implementation, and they may also be referred to as high-altitude lighter-than-air platforms (HALTAPs). For purposes of this disclosure, the general term "aircraft" should be understood as encompassing all such variations.

DETAILED DESCRIPTION

Figure 1:
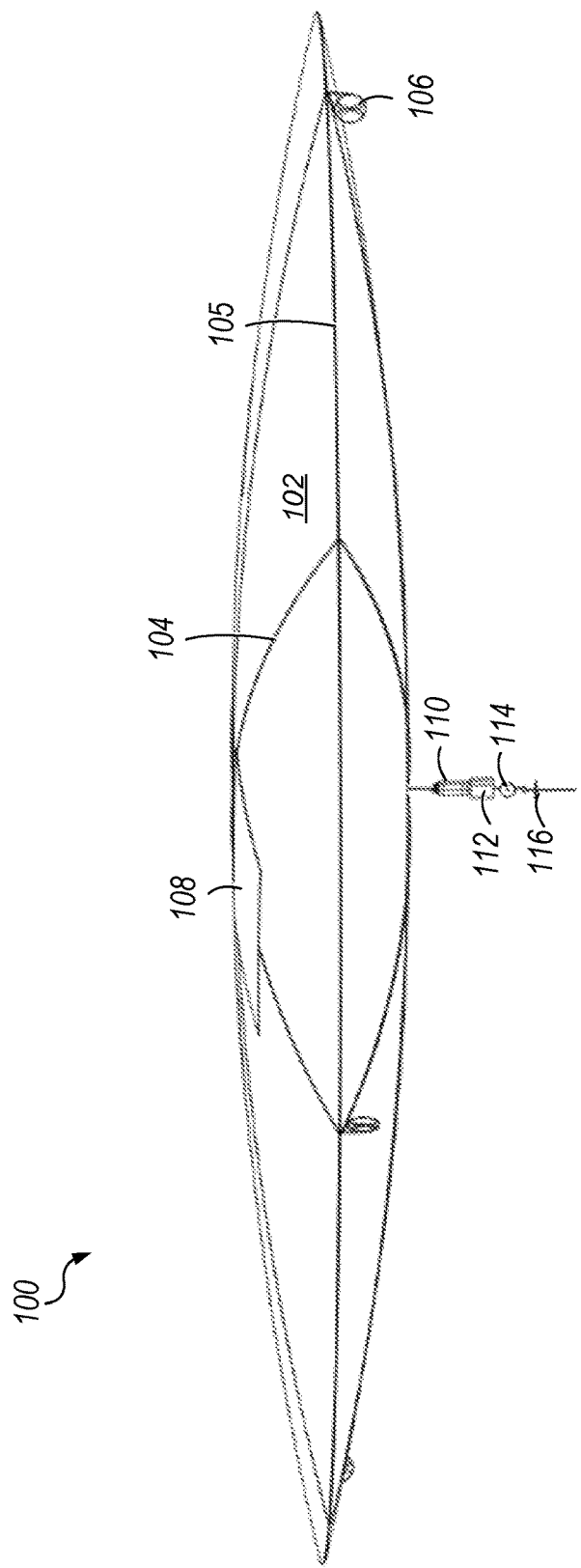
FIG. 1 is a perspective view of an aircraft, according to some embodiments.

The present disclosure provides for lighter-than-air aircraft that can be used for various purposes. In one embodiment, for example, such aircraft may be equipped with telecommunications equipment to provide connectivity to areas that would otherwise not be covered. Many different types of such connectivity are enabled within this disclosure, such as mobile phone (LTE, CDMA, GSM, etc.), wireless internet (Wi-Fi, WiMAX, proprietary technology, etc.), broadcast television, broadcast radio, air traffic control, and/or other types of connectivity. The backhaul for such connectivity may be provided via a mesh network made up of a plurality of such aircraft communicating with one another via high-gain microwave antennas, laser or other optical connections, other types of directional antennas, etc. For purposes of this disclosure, a "mesh" network is defined as including various types of network topology, including (for example) a simple link or a series of sequential links. That is, mesh networks need not be limited to grid-type topologies in which the aircraft have several neighbors in direct communication. This allows for a viable alternative to subsea cables, enabling mobile phone service providers, internet service providers (ISPs), and other providers to reach markets they would not otherwise be able to reach. Embodiments of this disclosure may also be used to establish private networks over long distances.

In some embodiments, other types of equipment may also be included, such as radar (which may be used for military or other purposes, to locate other lighter-than-air aircraft for mesh networking purposes, to locate other aircraft generally for navigational or other purposes, to monitor weather, etc.), scientific instrumentation (e.g., advanced weather monitoring, climate monitoring, earth observation, space observation with telescopes or antennas, etc.), cameras (e.g., real-time earth monitoring, HD, multiple spectrum, military or law enforcement, surveillance, traffic monitoring, etc.), power beaming equipment, and any other desired type of aerial equipment. In some embodiments, a lighter-than-air aircraft according to this disclosure may be sized to carry payloads of up to 200 pounds. In other embodiments, payloads of up to 400 pounds or even larger may be attainable with larger amounts of lifting gas, etc.

Aircraft according to this disclosure may travel at any desired altitude, but various considerations (such as typical wind speeds and regulatory concerns) may make it advantageous to travel in class E airspace at 60,000 feet above sea level or higher.

In some embodiments, backhaul connectivity for a group of aircraft may be established as a mesh network. For example, each aircraft may employ station-keeping techniques to maintain a selected geodetic position (e.g., by varying buoyancy for altitude adjustments and by using one or more propellers for rotational, latitude and longitude adjustments). If the aircraft are able to maintain position with sufficient accuracy, then directional antennas may be employed for communications among the aircraft. In some embodiments, a given aircraft's directional antenna may be aligned with other aircraft by rotating the entire aircraft to keep the directional antenna pointed in a desired direction. In other embodiments, directional antennas may be rotatable independently from the aircraft to which they are attached.

If a ground station such as an ISP has a hardwired link to a communications network, then one aircraft may be placed nearby to communicate with the ground station (e.g., via a directional antenna), and other aircraft may be placed in string or in some other configuration that allows communications to flow through the mesh back to the ground station. In some embodiments (e.g., with sufficiently powerful directional antennas), the curvature of the earth may be a limiting factor for how far apart aircraft according to this disclosure may be placed while still remaining in line-of-sight communication. For example, at a height of 60,000 feet above sea level (and assuming relatively flat terrain between adjacent aircraft), a spacing of around 600 miles may be feasible.

Aircraft according to this disclosure may provide a stable, reliable, long-life, low-cost platform. Further, the design of such aircraft makes them amenable to easy, compact transportation. For example, even though a deployed aircraft may be quite large (e.g., a diameter on the order of 200 feet), it may be deflated and "rolled up" (as described below) to fit into a standard 18-wheeler truck, shipping container, or rail container.

Station keeping, navigation, and various other functions of aircraft according to this disclosure may be computer-controlled in some embodiments. For example, an onboard computer may be configured to control the propellers and/or the buoyancy level of an aircraft. In some embodiments, such an onboard computer may be hard-coded with instructions as desired. In other embodiments, an onboard computer may be configured to receive instructions on the fly (e.g., from another aircraft or from a ground-based operator). For example, such instructions may in some embodiments be communicated via the mesh network backhaul.

Turning now to FIG. 1, an example of lighter-than-air aircraft 100 is shown. Lighter-than-air aircraft 100 is shown with an aerodynamic lenticular (lens-shaped) outer membrane 102, and rigid ring 105 is disposed around the circumference thereof. Typically, although not necessarily, outer membrane 102 is airtight.

The lenticular shape of outer membrane 102 reduces drag applied by the wind, but various other shapes are also possible within the scope of this disclosure. As will be discussed in more detail below, rigid ring 105 may be arranged in several sections that can be disassembled from one another (for example, to reduce size during ground shipping of aircraft 100). Several structural members 104 extend radially from a central core portion (not shown) to rigid ring 105. One or more flexible bladders (not shown) inside outer membrane 102 may be filled with a lighter-than-air gas such as hydrogen or helium, also referred to as a lifting gas. Aircraft 100 also includes several propellers 106, which may be used for station keeping and/or to move aircraft 100 to a desired location. Propellers 106 may be mounted rigidly to rigid ring 105, or they be mounted rotatably to allow them to exert force in different directions as desired. In some embodiments, propellers 106 may be mounted in propeller nacelles attached to rigid ring 105. In some embodiments, four propellers 106 may be positioned at even intervals around the circumference of rigid ring 105.

Power for propellers 106 and for other onboard devices may be provided via one or more solar panels 108. Due to the design of aircraft 100, it may be advantageous to use flexible solar panels.

Outer membrane 102 may in some embodiments be made of a flexible material such as biaxially-oriented polyethylene terephthalate (BoPET), commonly referred to as MYLAR®. In some embodiments, the flexible bladders inside outer membrane 102 may be made of the same material. In other embodiments, outer membrane 102 may be made of a rigid material. In some embodiments, structural members 104 may be used as non-rigid tension elements to maintain the shape of outer membrane 102 against the pressure of the lighter-than-air gas in the bladder(s) inside. In other embodiments, structural members 104 may be rigid.

Figure 10:
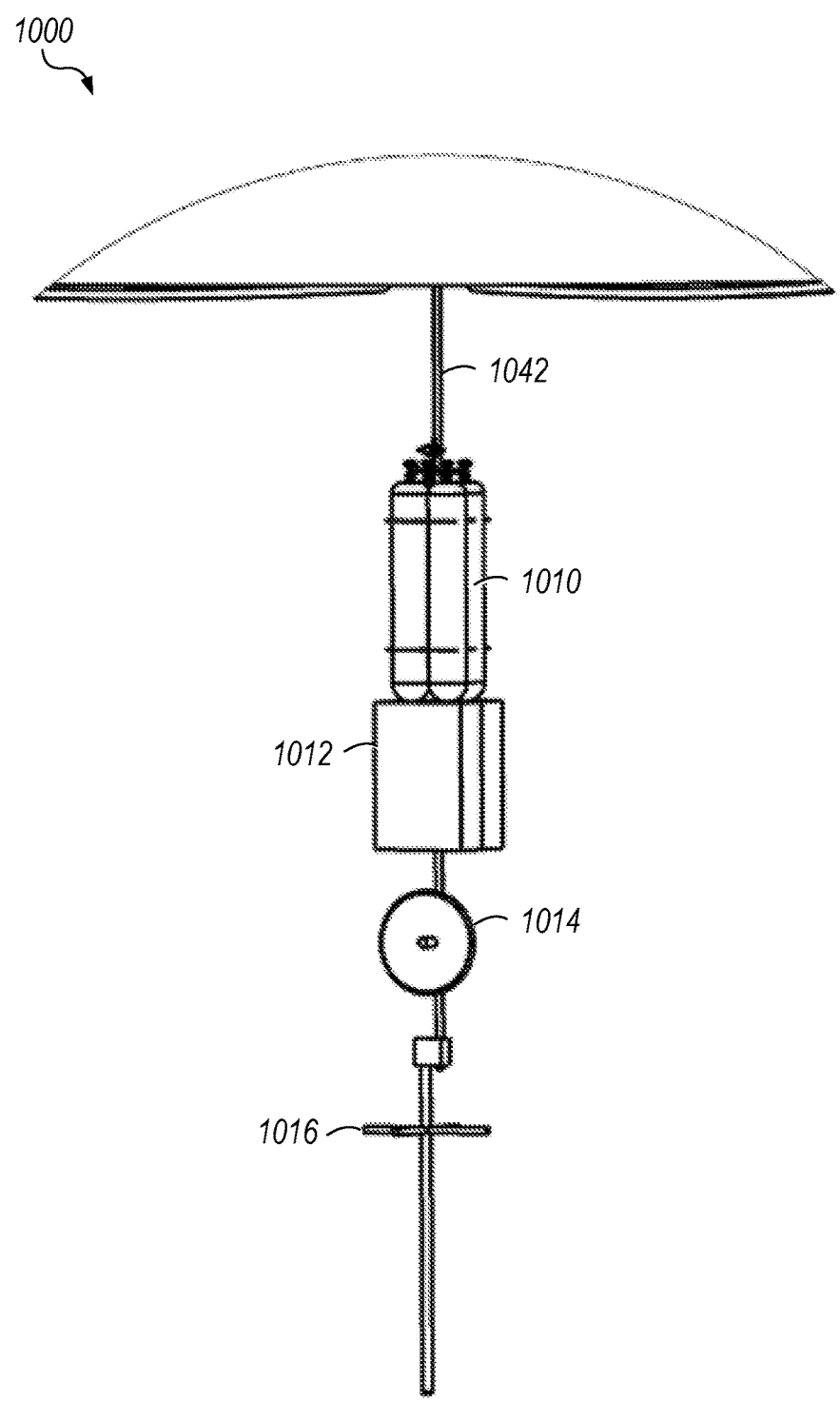
FIG. 10 is a detail view of a payload of a lighter-than-air aircraft, according to some embodiments.

As shown in FIG. 1, various additional elements for aircraft 100 are attached to the bottom. (A more detailed view of these elements is shown in FIG. 10.) This arrangement, in which the center of gravity is lowered by such elements, may provide additional stability compared to other arrangements. One or more tanks 110 of compressed lifting gas, control circuitry 112, one or more directional antennas 114, and one or more non-directional (also referred to as omnidirectional) antennas 116 are shown attached to the bottom of aircraft 100. Directional antennas 114 may be used for mesh networking among aircraft, for communicating with ground stations, etc. Non-directional antennas 116 may be used for providing mobile phone service, Wi-Fi connections, etc.

Tanks 110 of compressed lifting gas may be used to refill the bladders inside outer membrane 102 to account for losses due to diffusion or leaks. Tanks 110 may also be used to add lifting gas from the bladders to increase the buoyancy of aircraft 100. Gas may also be released from the bladders to decrease buoyance. In some embodiments, a compressor may be included so that gas removed from the bladders may be placed back into tanks 110; in other embodiments, gas removed from the bladders may be vented to the atmosphere.

Control circuitry 112 generally includes any circuitry, computing devices, or other hardware needed to operate aircraft 100. Control circuitry 112 may also include the telecommunications circuitry used to communicate via directional antennas 114 and non-directional antennas 116. As one example, telecommunications circuitry may include the same type of circuitry that is typically deployed within a cell tower. In another example, more than one set of such cell tower circuitry may be included in control circuitry 112 for purposes of providing more than one type of cellular service (e.g., for different providers). In yet another example, a customized set of circuitry configured to carry out such functions may be included in control circuitry 112. For example, some otherwise-redundant functionality in multiple sets of cell tower circuitry may be consolidated into a single set of circuitry to save weight.

Control circuitry 112 may also include one or more batteries to be charged by solar panel 108 and to power aircraft 100 at night. In some embodiments, it may be advantageous to thermally insulate control circuitry 112, for example because batteries may not perform well at the cold temperatures that are typical at 60,000 feet and higher. In some embodiments, one or more heaters may be included in control circuitry 112 for this reason; in other embodiments, the waste heat from other components of control circuitry 112 may be sufficient to maintain a desired temperature.

Figure 2:
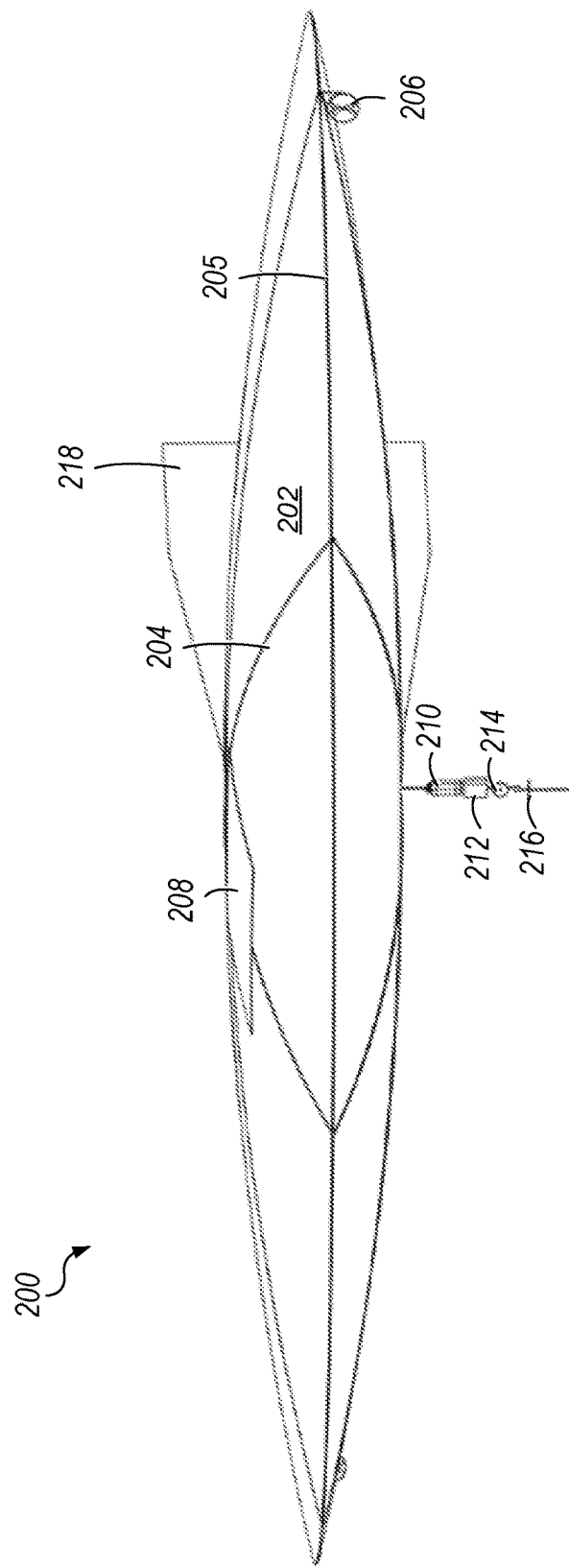
FIG. 2 is a perspective view of another aircraft, according to some embodiments.

Turning now to FIG. 2, another similar embodiment is shown as aircraft 200. The components of aircraft are generally similar to those having corresponding reference numerals. That is, outer membrane 202 corresponds to outer membrane 102 in FIG. 1, etc. (In FIG. 2 and other figures, for the sake of brevity, corresponding elements with corresponding reference numerals may not be described in detail in every figure when it is clear from context what such reference numerals refer to.)

In addition to the elements that are similar to aircraft 100, aircraft 200 further includes tail 218. Tail 218 in some embodiments may be used similarly to a tail fin in a windmill, to keep aircraft 200 pointing into the wind so that propellers 206 in certain arrangements may operate more efficiently to keep station. In other embodiments, tail 218 may be adjustable and usable as a rudder to steer aircraft 200. Generally speaking, any vertical member (or any member with a vertical component) may be used for such purposes. In some embodiments, tail 218 may be formed as an airfoil; in other embodiments, tail 218 may be formed as a flat surface.

Figure 3:
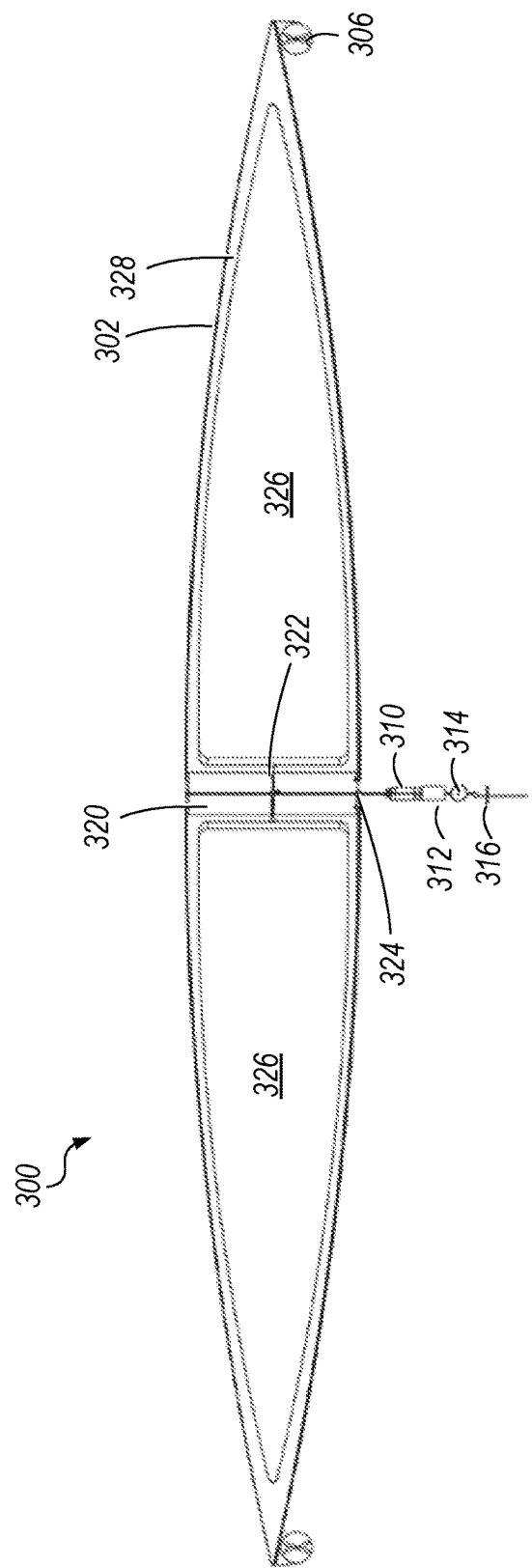
FIG. 3 is a cross-sectional view of an aircraft, according to some embodiments.

Turning now to FIG. 3, a cross-sectional view of aircraft 300 is shown. Inside outer membrane 302, two bladders 326 are now visible. Bladders 326 may be filled with any suitable lighter-than-air gas to provide buoyancy to aircraft 300. In between outer membrane 302 and bladders 326, interstitial space 328 is designated. Interstitial space 328 may be maintained at any desired pressure and may affect the overall volume (and thus the overall buoyancy) of the lifting gas. In some embodiments, interstitial space 328 may be maintained at the same pressure as bladders 326. In other embodiments, the pressures may be substantially equal ("substantially equal" being defined, for purposes of this disclosure, as within 1% of equal). In still other embodiments, the pressures may be within 5% of equal. In yet other embodiments, the pressure in interstitial space 328 may be maintained at whatever pressure is needed to cause bladders 326 to attain a desired volume. Maintaining interstitial space 328 at a pressure similar to that of bladders 326 may reduce the rate of diffusion of lighter-than-air gas out of bladders 326 into interstitial space 328, and so it may be advantageous to keep the pressures relatively close.

Also visible in FIG. 3 is rigid core 320, which is cylindrically disposed along the central axis of aircraft 300. Rigid core 320 provides some structural support to aircraft 300, and it may also house various components. For example, in FIG. 3, gas distribution valves 322 are shown inside rigid core 320. Gas distribution valves 322 may be used to control the amount of lighter-than-air gas in each bladder 326. In some embodiments, the amount of lighter-than-air gas in each bladder may be adjusted independently. For example, this may be done in order to achieve a desired pitch or angle (as a non-horizontal angle may be advantageous during ascent or descent, as well as other times). In this embodiment, rigid core 320 further includes compressor 324, which may be used to adjust the pressure in the interstitial space. In some embodiments, an additional compressor (not shown) may remove lighter-than-air gas from bladders 326 and store it in tanks 310.

Figure 4:
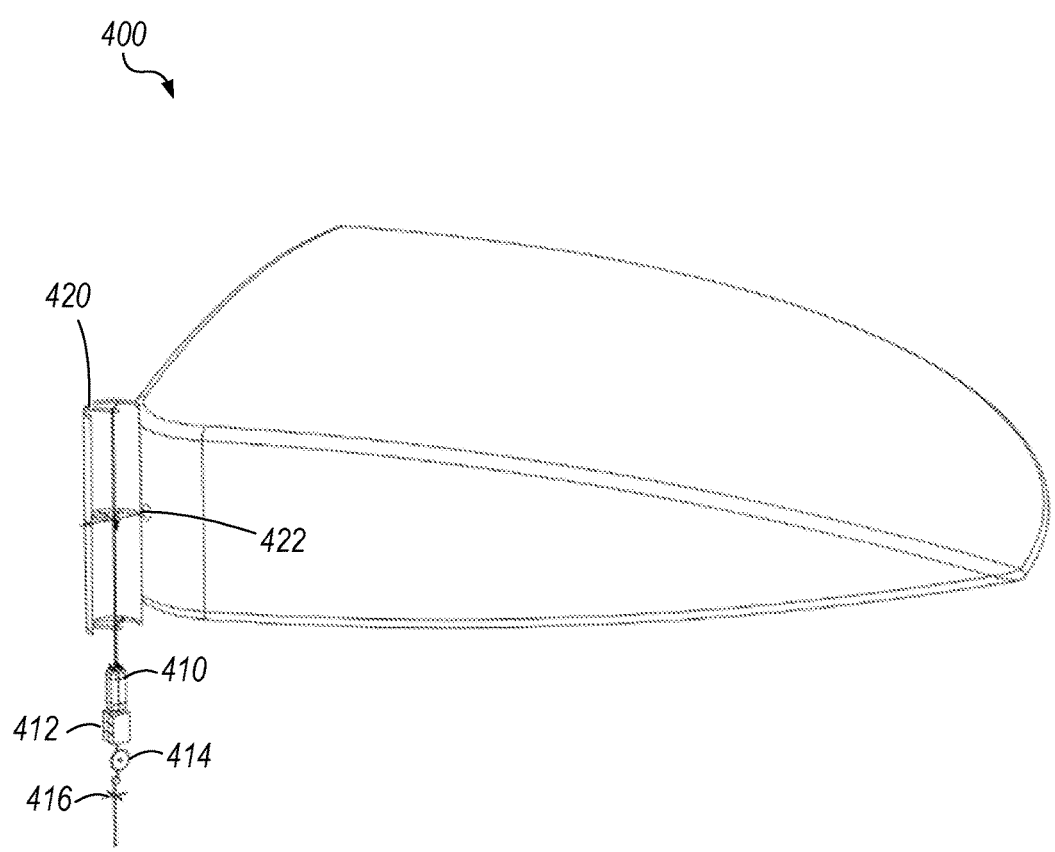
FIG. 4 is a perspective view of a bladder for holding a lighter-than-air gas and a core portion of a lighter-than-air aircraft, according to some embodiments.

Turning now to FIG. 4, an embodiment of bladder 400 is shown that is similar to one of bladders 326 in FIG. 3. Tanks 410 provide lighter-than-air gas to bladder 400 via gas distribution valve 422.

As pictured, bladder 400 subtends one quarter of a full circular arc, and so in this embodiment, four bladders 400 would be used in a single aircraft. In various embodiments, one, two, three, four, five, or any other number of bladders may be used in a particular aircraft as desired.

Figure 5:
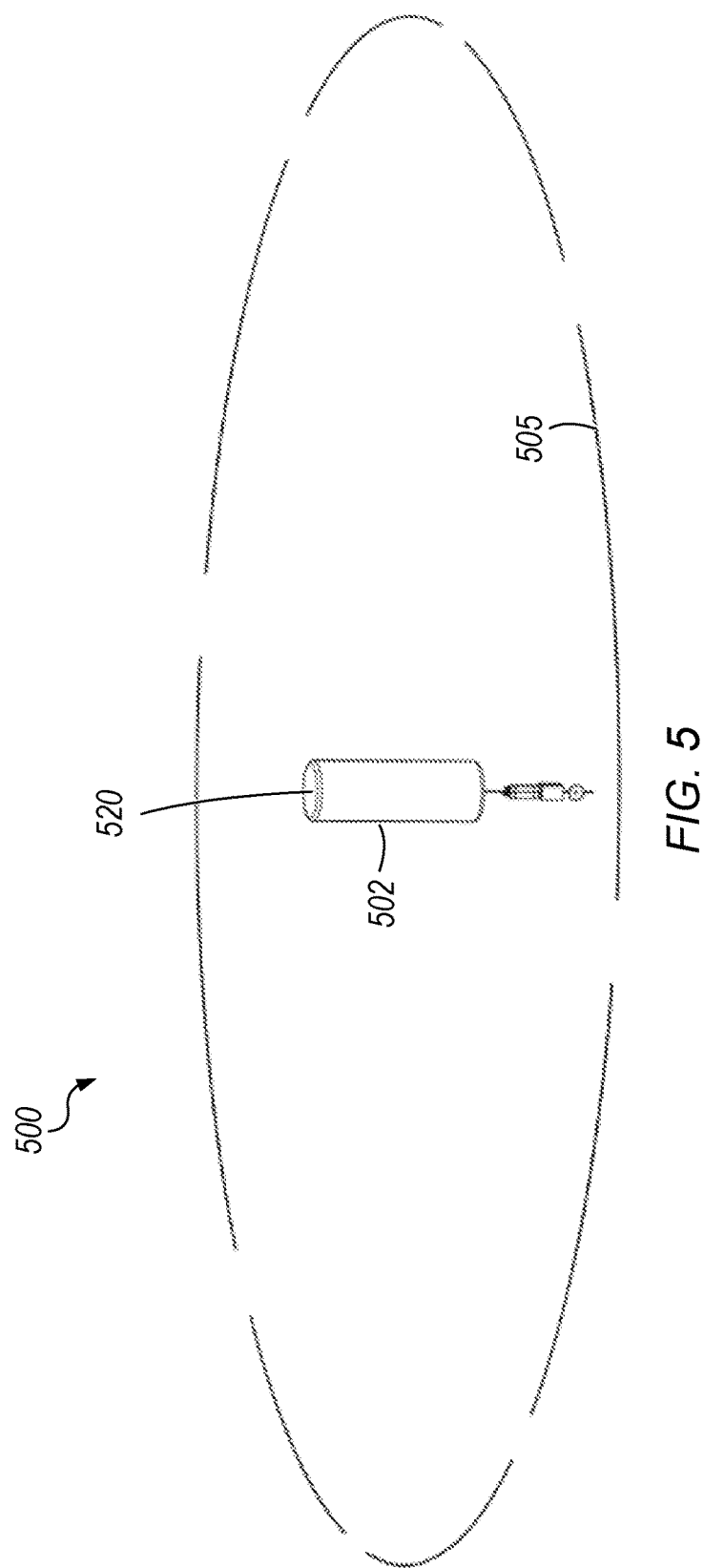
FIG. 5 is a perspective view of a deflated and partially disassembled lighter-than-air aircraft, according to some embodiments.

Turning now to FIG. 5, a partially disassembled lighter-than-air aircraft 500 is shown. The rigid ring mentioned in the earlier figures has been disassembled into rigid ring segments 505. In one embodiment, rigid ring segments 505 are configured to attach together end-to-end in a "tent pole" configuration, wherein the tip of one segment goes inside a hole at the tip of the next segment. Various other embodiments for a rigid ring that can be disassembled into rigid ring segments 505 will be apparent to one of ordinary skill in the art with the benefit of this disclosure, however. When aircraft 500 is assembled, the assembled rigid ring segments may be embedded in the outer membrane or attached to the outer membrane in any suitable manner.

As shown, outer membrane 502 with deflated bladders inside (which are not visible in this view) has been wrapped around rigid core 520. Accordingly, disassembled aircraft 500 has been drastically reduced in size compared to its deployed dimensions.

Figure 6:
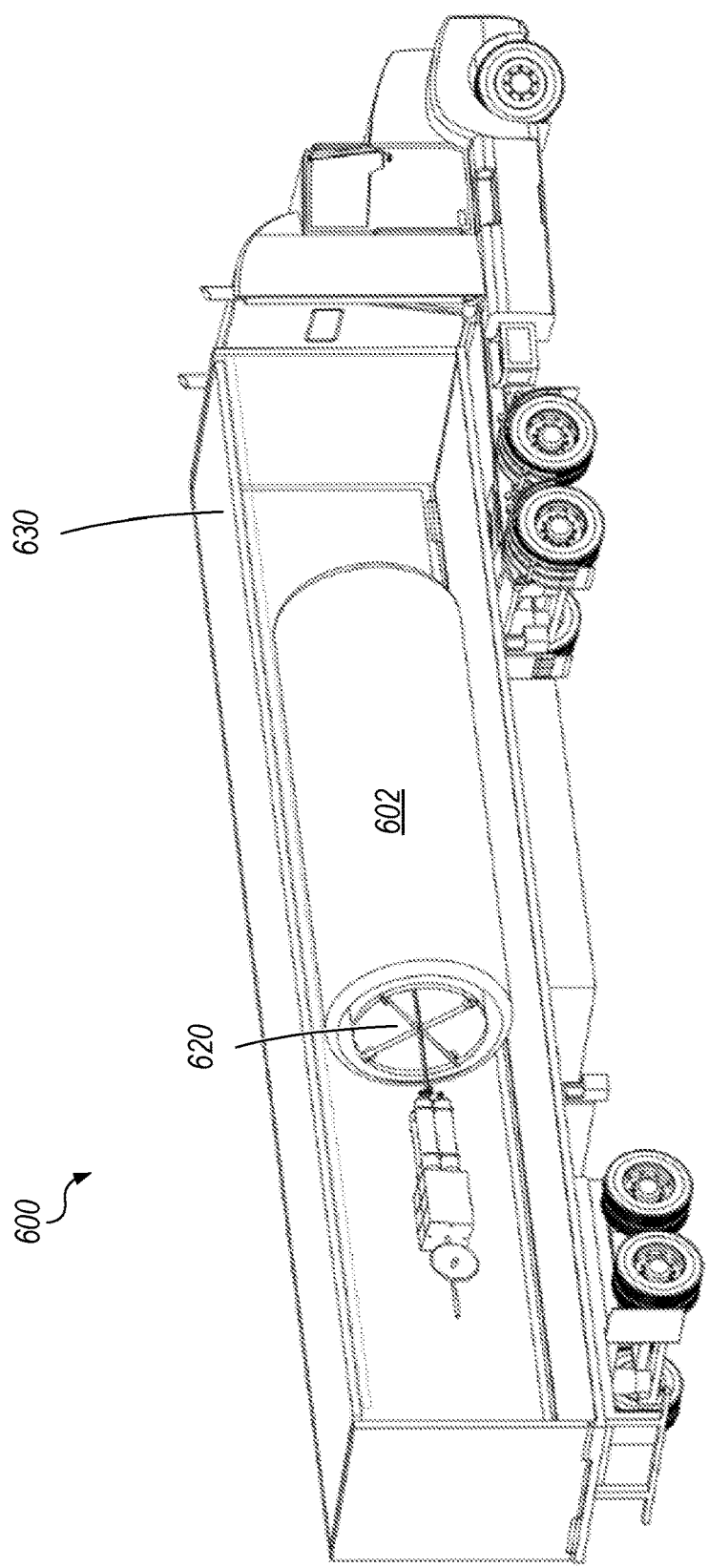
FIG. 6 is a view of a deflated lighter-than-air aircraft being transported, according to some embodiments.

Turning now to FIG. 6, disassembled aircraft 600 is shown being transported in a standard 18-wheeler, truck 630. The ability to deflate the lighter-than-air gas bladders, remove the rigid ring segments, and wrap the bladders and outer membrane 602 around rigid core 620 provides for extremely easy transport and deployment of aircraft 600. Rigid ring segments (not shown) may be stored alongside aircraft 600 within truck 630 or in any other suitable manner.

Once disassembled aircraft 600 has arrived at its deployment location, it may be assembled and deployed relatively quickly, in just a few hours. At a high level, the deployment procedure includes inflating the outer membrane somewhat to give shape to the aircraft (e.g., the interstitial space may be inflated), attaching the rigid ring to the outer membrane, attaching any solar panels and propeller nacelles, and inflating the lighter-than-air gas bladders inside the outer membrane. The aircraft may then be pressure-tested and deployed immediately.

The deployment term of an aircraft according to this disclosure may be quite long, extending without service for years in some embodiments. Eventually, however, it may become necessary to recover a deployed aircraft for service, upgrades, and the like. The recovery of an aircraft at the end of its deployment is similar to the procedure described above, but in reverse. The aircraft may be instructed to remove some lighter-than-air gas (or to increase the pressure in the interstitial space to reduce the volume of the bladders) to reduce the buoyancy of the aircraft and bring it to the ground, and then the bladders may be deflated. The solar panels and propeller nacelles may be removed, the rigid ring may be removed and disassembled, and the interstitial space may be deflated. Finally, the outer membrane (e.g., with the bladders still inside) may be wrapped around the rigid core.

Figure 7:
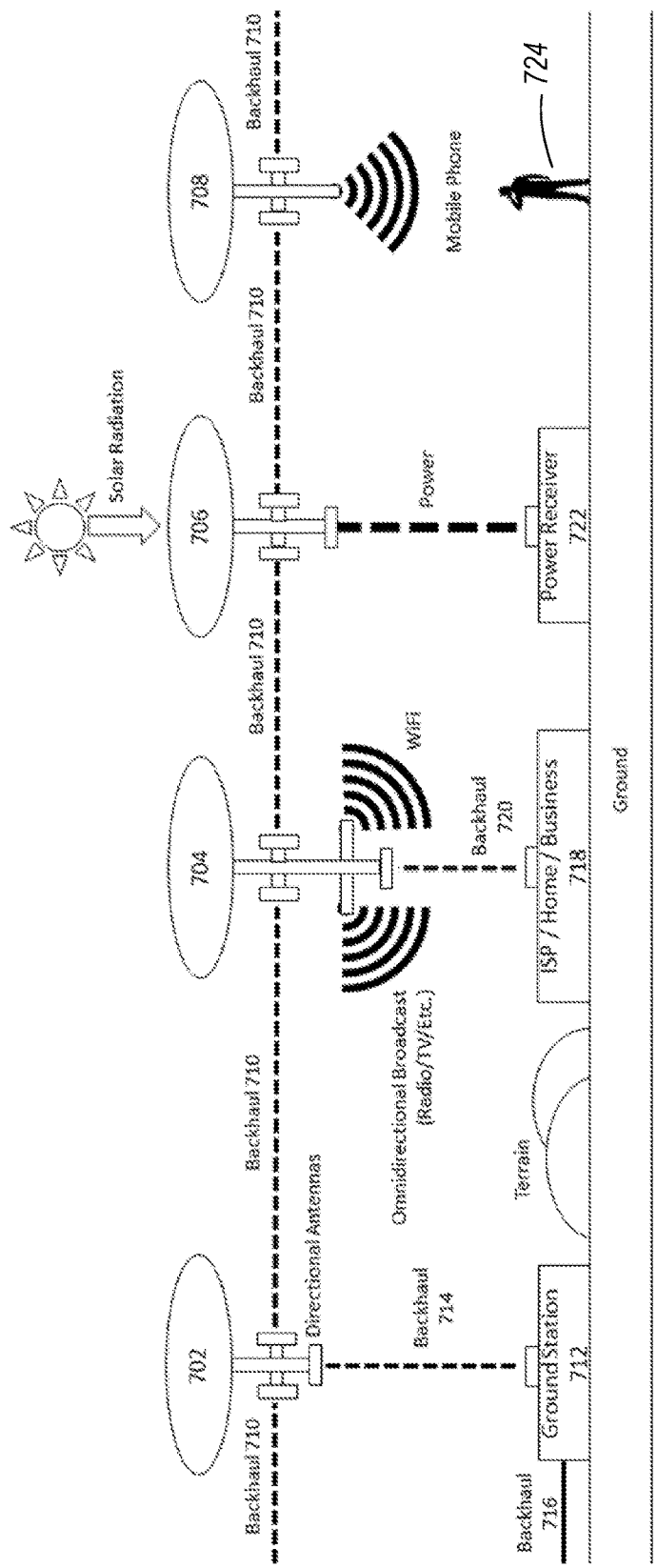
FIG. 7 is a block diagram of several lighter-than-air aircraft carrying out different functions, according to some embodiments.

Turning now to FIG. 7, a plurality of lighter-than-air aircraft 702, 704, 706, and 708 are shown carrying out various functions. Aerial backhaul 710, which may be implemented via directional antennas such as high-gain microwave antennas, connects each aircraft to the other aircraft in a mesh network.

Ground station 712 is linked to the greater internet via ground-based backhaul 716 and receives various types of data via that connection. For example, TV and radio stations (not shown) may provide data via ground-based backhaul 716 that is to be broadcast. Aircraft 702 is connected to ground station 712 via air-to-ground backhaul 714 and transmits such data to aircraft 704 via aerial backhaul 710. (The term "air-to-ground backhaul" should be understood to include data links that flow in either direction or both directions.) Aircraft 704 is then able to broadcast the data (e.g., radio broadcast data, TV broadcast data, or other broadcast data) via one or more omnidirectional antennas. As shown, due to the terrain between ground station 712 and the broadcast area underneath aircraft 704, this procedure would be infeasible without the benefit of this disclosure.

Additionally, aircraft 704 has a data connection to building 718 (which may be a ground-based ISP, a home, or a business) via air-to-ground backhaul 720. Building 718 may thus receive internet backhaul to the greater internet via air-to-ground backhaul 720, aerial backhaul 710, and finally ground-based backhaul 716. Thus in some embodiments, aircraft according to this disclosure may be used as a tier 1 solution that provides backhaul to a traditional ISP.

Finally, aircraft 706 is an element of the mesh network and participates as a link in aerial backhaul 710, but it does not provide any additional telecommunications services to its coverage area (which, for a typical LTE antenna, might be an area of approximately 3420 square miles). However, surplus solar radiation collected at the solar panels of aircraft 706 may be transmitted (e.g., via microwave power transmission technology or any other suitable method) to ground-based power receiver 722. In some embodiments, aircraft 706 may employ a station-keeping strategy that keeps its solar panels aimed toward the sun (at least to some extent) as the sun tracks across the sky. For example, aircraft 706 may be rotated such that an amount of solar radiation incident on its solar panels is maximized. That is, aircraft 706 may be configured to maintain a particular position, but to change its geodetic rotational orientation in response to the position of the sun. In such an embodiment, it may be desirable to employ independently rotatable directional antennas (described in more detail below with reference to FIG. 11) to maintain aerial backhaul 710 while aircraft 706 rotates.

FIG. 7 provides a few examples of the types of things that are made possible according to the present disclosure. Various other uses to which the aircraft of this disclosure may be put will be apparent to one of ordinary skill in the art with the benefit of this disclosure.

Figure 8A:
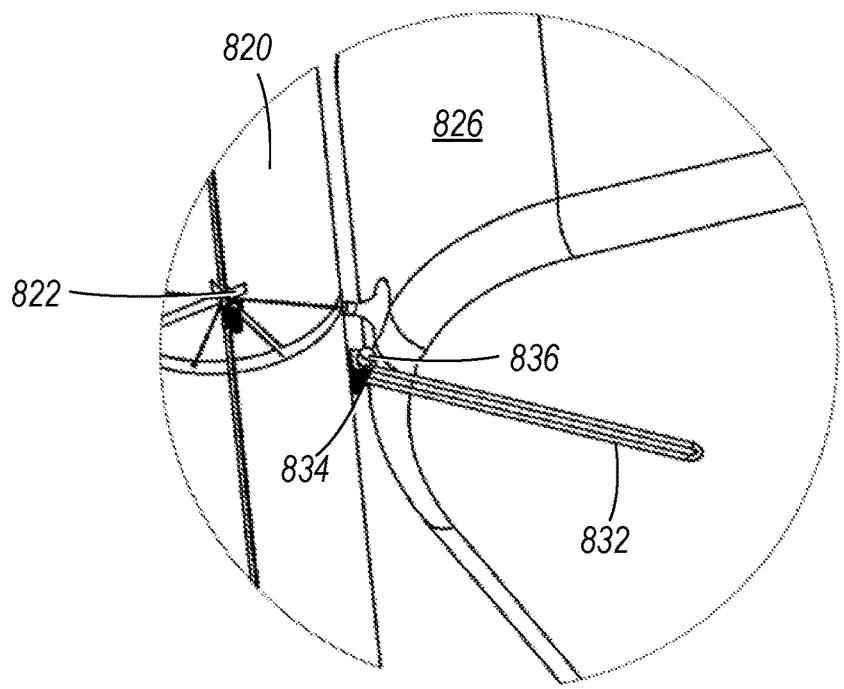
FIGS. 8A and 8B are detail views of an inflation-measuring device, according to some embodiments.
Figure 8B:
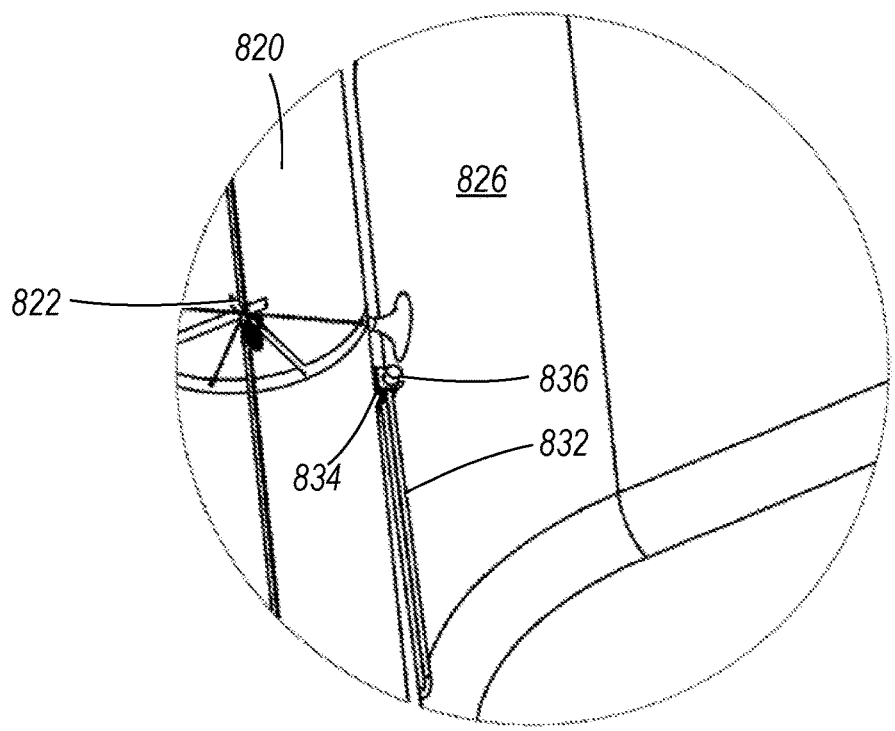

Turning now to FIGS. 8A and 8B, close-up views of an embodiment of a device for measuring the inflation level of a bladder are shown. Bladder 826 may be installed in any of the various aircraft of this disclosure.

As shown, rigid core 820 includes gas distribution valve 822 for filling (or otherwise adjusting the inflation level of) bladder 826. Lever arm 832 is configured to press inward against a surface of bladder 826 (to which it may or may not be attached). Tension element 834, such as a spring may be used to provide some force against the surface of bladder 826. Potentiometer 836 measures the angular position of lever arm 832.

In FIG. 8A, bladder 826 is partially deflated, and the position of lever arm 832 reflects this. In FIG. 8B, bladder 826 has been fully inflated, and the position of lever arm 832 has adjusted to reflect this new state. The value of potentiometer 836 will also reflect this change, and can be measured in any of various known ways. Once calibrated, the value of potentiometer 836 can be correlated directly to the inflation level of bladder 826.

In some embodiments, lever arm 832 may be coupled to rigid core 820. For example, a pivot of lever arm 832 may be disposed at a central top portion of the aircraft.

In some embodiments, one lever arm 832 is used for each bladder in the aircraft. In other embodiments, arrangements are contemplated in which multiple lever arms 832 are used for each bladder.

Figure 9A:
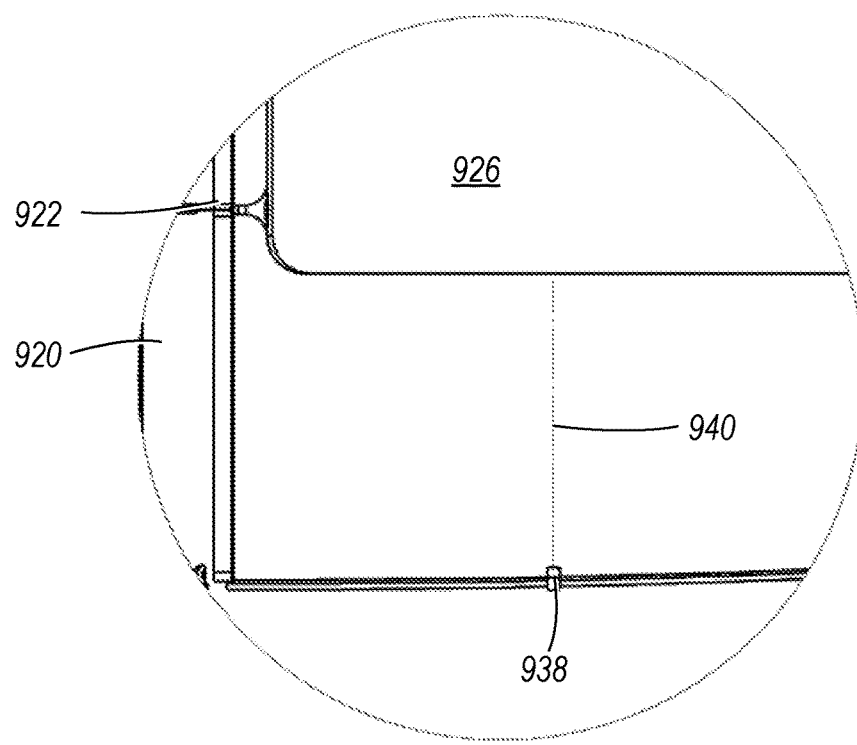
FIGS. 9A and 9B are detail views of another inflation-measuring device, according to some embodiments.
Figure 9B:
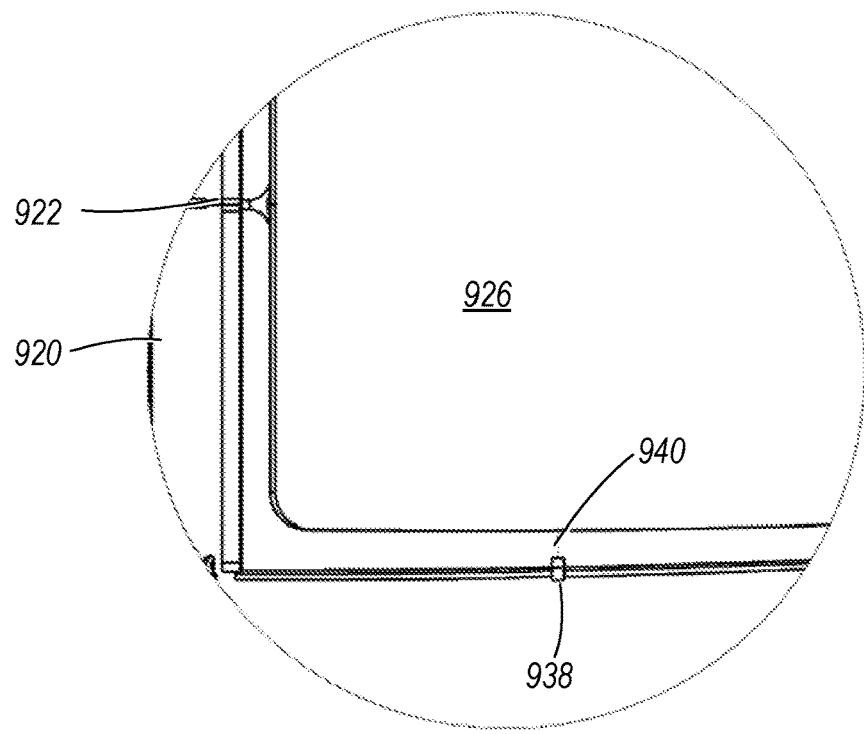

Turning now to FIGS. 9A and 9B, close-up views of another embodiment of a device for measuring the inflation level of a bladder are shown. This embodiment uses optical measuring, such as a laser ranging system, to determine the position of a surface of bladder 926. For example, such a system might measure a delay time associated with a reflection of an optical pulse to determine a distance. In other embodiments, a camera-based measuring apparatus may be used.

Similarly to in FIGS. 8A and 8B, bladder 926 is attached to rigid core 920, and its inflation level is controlled via gas distribution valve 922. Optical measuring device 938 is configured to measure a distance 940 to a selected location on the surface of bladder 926.

As shown in FIG. 9A, bladder 926 is partially deflated, and distance 940 is measured as being a relatively large value. In FIG. 9B, bladder 926 has been fully inflated, and distance 940 is measured as being a smaller value. Once calibrated, the value measured for distance 940 can be correlated directly to the inflation level of bladder 926.

Once an inflation level has been measured (e.g., as in FIGS. 8A and 8B, or FIGS. 9A and 9B), various actions may be taken based on the result. If the inflation level is lower than desired, additional lifting gas may be supplied to the bladders. If the inflation level is higher than desired, some lifting gas may be removed from the bladders, and either vented to the atmosphere or re-compressed into a storage tank. Alternatively, pressure may be increased in the interstitial space to reduce the volume of the bladders.

Turning now to FIG. 10, a close-up view of the elements that may be suspended below aircraft 1000 is shown. Similar to what was described above with reference to FIG. 1, such elements may include lighter-than-air gas tanks 1010, control circuitry 1012, directional antenna 1014, and non-directional antenna 1016.

These elements (and any other desired elements) may be suspended from aircraft 1000 via rigid member 1042. Rigid member 1042 may enclose gas tubing (not visible) for allowing lighter-than-air gas to flow between tanks 1010 and the bladders via the gas distribution valves in the rigid core. In some embodiments, rigid member 1042 may itself be a rigid, airtight pipe, and so a separate gas tubing element may not be necessary. Rigid member 1042 may be removed from the rigid core (not shown) in order to ease transportation and/or construction of the rigid ring while on the ground. Rigid member may also be mounted on a hinge, shifting the center of gravity, and thereby changing the pitch (angle) of the aircraft as desired for optimal ascent and descent.

Figure 11:
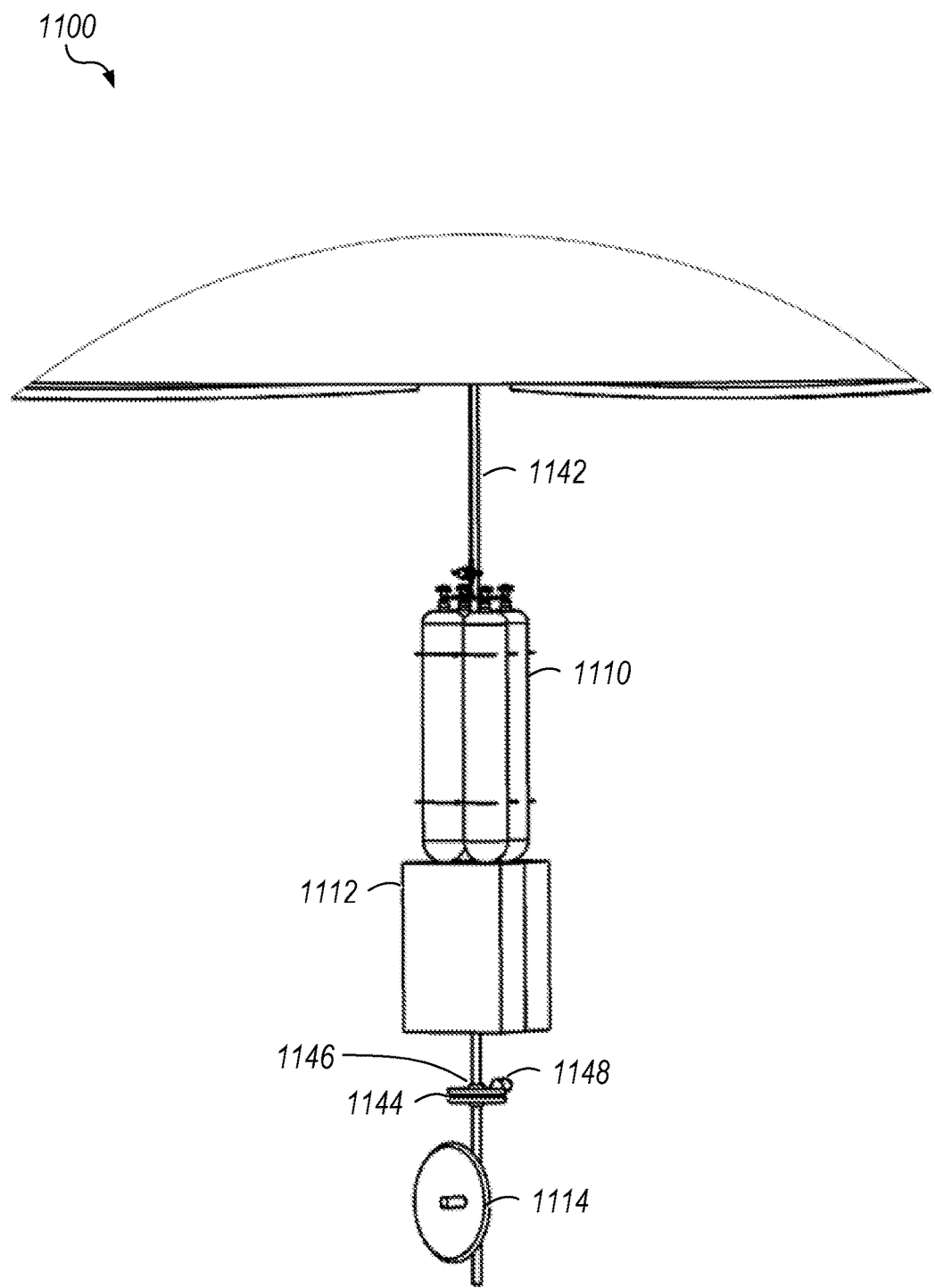
FIG. 11 is a detail view of another payload of a lighter-than-air aircraft, according to some embodiments.

Turning now to FIG. 11, another close-up view of elements that may be suspended below aircraft 1100 is shown. As above, such elements may include lighter-than-air gas tanks 1110, control circuitry 1112, and directional antenna 1114. Additionally, aircraft 1100 includes rotatable joint 1144, which includes slip ring 1146 for transmission of power and/or signals between control circuitry 1112 and directional antenna 1114. In some embodiments, wireless data and/or power transmission techniques may be used instead of connections based on slip ring 1146.

As shown, directional antenna 1114 may be rotated separately from the rest of aircraft 1100 by antenna drive motor 1148. That is, directional antenna 1114 may be rotated actively and independently, for example to maintain antenna alignment with some other aircraft or a ground station as aircraft 1100 itself rotates (e.g., due to wind, or to track the sun with its solar panels, or for any other reason). In other embodiments, directional antenna 1114 may be rotated even while aircraft 1100 is not rotating, for example to change its direction from one aircraft to a different aircraft.

In embodiments with more than one directional antenna, a plurality of rotatable joints and motors may be used to rotate each directional antenna independently. For example, such an embodiment may allow aircraft 1100 to track several other aircraft simultaneously, whether or not aircraft 1100 is itself currently rotating. In other embodiments with multiple directional antennas, only one rotatable joint and motor might be used, such that all of the directional antennas are set at fixed angles relative to one another. In that case, the entire assembly of directional antennas may be rotated as a whole, for example to maintain alignment within a mesh network. Further, in some embodiments, each directional antenna may be adjusted in the vertical direction as well if necessary. For example, each directional antenna may be attached to a gimbal mount or any other type of vertically adjustable mount.

Example Methods

Various methods of making and using the aircraft and other apparatuses disclosed herein are also specifically contemplated within the scope of this disclosure. Some of such methods will now be described; others will be apparent to one of ordinary skill in the art with the benefit of this disclosure. The methods herein may be used in conjunction with any of the aircraft, apparatuses, computer systems, or components disclosed herein, among other devices. In various embodiments, some of the method elements shown may be performed concurrently, in a different order than shown, or may even be omitted altogether. Additional method elements may also be performed as desired.

Figure 12:
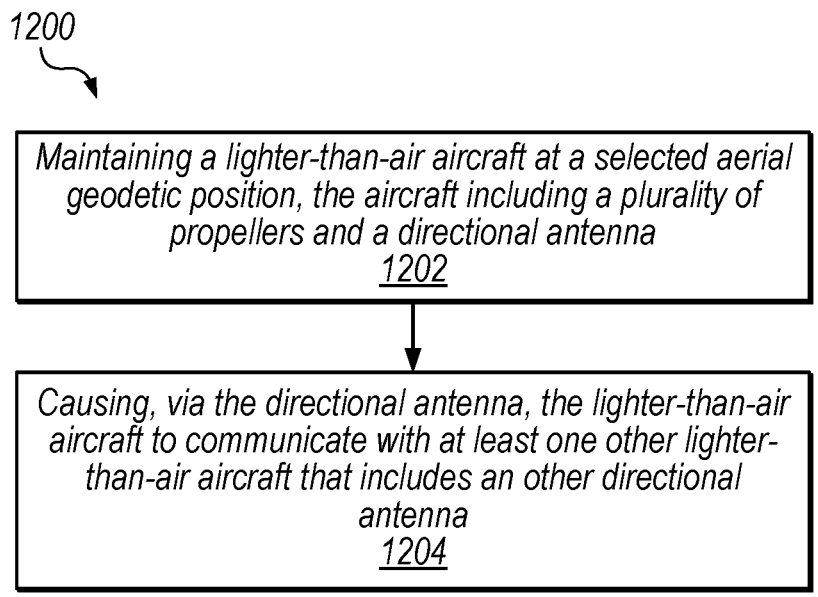
FIG. 12 is a block diagram of a process flow, according to some embodiments.

Turning now to FIG. 12, a block diagram of one example of such a method, process flow 1200, is shown. Flow begins at step 1202.

At step 1202, a lighter-than-air aircraft that includes a plurality of propellers and a directional antenna is maintained at a selected aerial geodetic position. For example, the lighter-than-air aircraft may be maintained at the selected aerial geodetic position by actuating the propellers, adjusting buoyancy, etc. Flow proceeds to step 1204.

At step 1204, the lighter-than-air aircraft is caused to communicate via the directional antenna with another lighter-than-air aircraft. As shown, the other lighter-than-air aircraft also includes a corresponding directional antenna, which may be used for such communications. Flow ends at step 1204.

Example Computing System

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Various embodiments may include storing instructions and/or data implemented in accordance with the foregoing description in a tangible computer-readable memory medium. Certain embodiments of these computer-readable memory media may include instructions and/or data that are computer executable to perform actions in accordance with the present disclosure. Generally speaking, such an article of manufacture may include storage media or memory media such as magnetic (e.g., disk) or optical media (e.g., CD-ROM and related technologies, DVD-ROM, etc.). The article of manufacture may be either volatile or nonvolatile memory. For example, the article of manufacture may be (without limitation) RAM of various types, flash memory, ROM of various types, etc. The article of manufacture may also be a transmission medium.

Further embodiments may include signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description.

Figure 13:
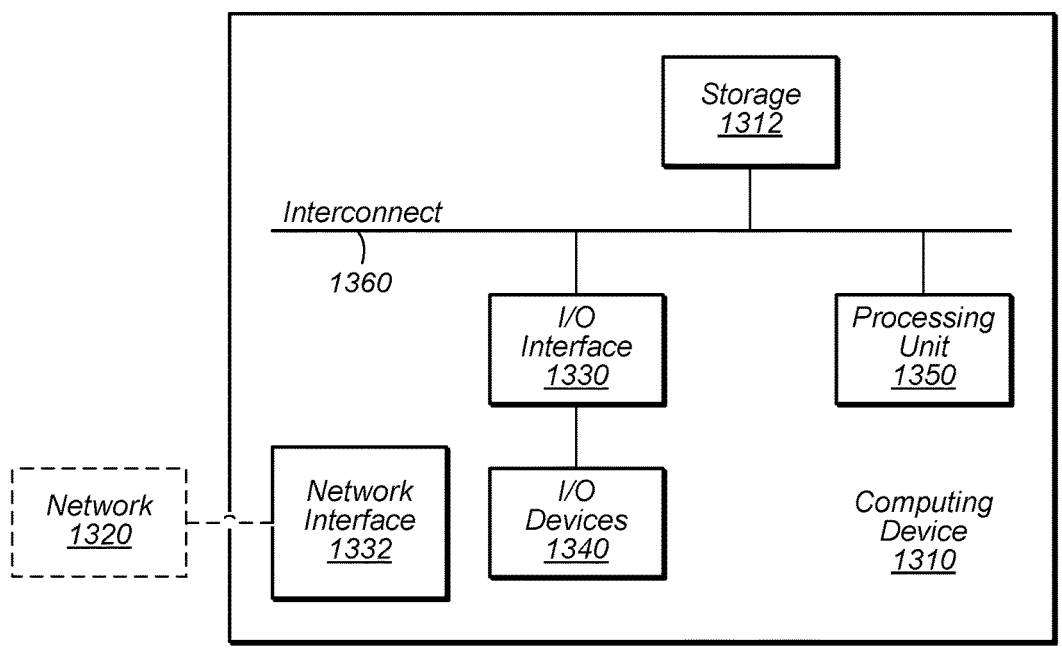
FIG. 13 is a block diagram of an example computing system, according to some embodiments.

Turning now to FIG. 13, a block diagram of a computing device (which may also be referred to as a computing system) 1310 is depicted, according to some embodiments. Computing device 1310 may be used to implement various portions of this disclosure. Computing device 1310 is one example of a device that may be used as a mobile device, a server computing system, a client computing system, an embedded computing system, a microcontroller-based computing system, or any other computing system implementing portions of this disclosure.

Computing device 1310 may be any suitable type of device, including, but not limited to, a personal computer system, desktop computer, laptop or notebook computer, mobile phone, mainframe computer system, web server, workstation, or network computer. As shown, computing device 1310 includes processing unit 1350, storage subsystem 1312, input/output (I/O) interface 1330 coupled via interconnect 1360 (e.g., a system bus). I/O interface 1330 may be coupled to one or more I/O devices 1340. Computing device 1310 further includes network interface 1332, which may be coupled to network 1320 for communications with, for example, other computing devices.

As described above, processing unit 1350 includes one or more processors. In some embodiments, processing unit 1350 includes one or more coprocessor units. In some embodiments, multiple instances of processing unit 1350 may be coupled to interconnect 1360. Processing unit 1350 (or each processor within processing unit 1350) may contain a cache or other form of on-board memory. In some embodiments, processing unit 1350 may be implemented as a general-purpose processing unit, and in other embodiments it may be implemented as a special purpose processing unit (e.g., an ASIC). In general, computing device 1310 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 1312 is usable by processing unit 1350 (e.g., to store instructions executable by and data used by processing unit 1350). Storage subsystem 1312 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1312 may consist solely of volatile memory in some embodiments. Storage subsystem 1312 may store program instructions executable by computing device 1310 using processing unit 1350, including program instructions executable to cause computing device 1310 to implement the various techniques disclosed herein.

I/O interface 1330 may represent one or more interfaces and may be any of various types of interfaces configured to couple to and communicate with other devices, according to various embodiments. In some embodiments, I/O interface 1330 is a bridge chip from a front-side to one or more back-side buses. I/O interface 1330 may be coupled to one or more I/O devices 1340 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Example Embodiments

A numbered list of example embodiments follows. Although they are written in claim-like language, these embodiments are not the claims of this application (which follow in a separate section), but are merely a number of embodiments that are specifically contemplated and disclosed herein. This list should be taken as exemplary, not exclusive.

1. An apparatus, comprising: an outer membrane formed in a circular lenticular shape by a plurality of structural members, wherein the structural members extend radially along the circular lenticular shape; a flexible bladder within the outer membrane; a rigid circular ring disposed circumferentially around the circular lenticular shape; and a plurality of propellers coupled to the apparatus and operable to maintain the apparatus in a selected geodetic position; wherein the apparatus is operable to float at a selected altitude based on a quantity of lighter-than-air gas in the flexible bladder.

2. The apparatus of any other embodiment, further comprising: a solar panel configured to provide power to the apparatus.

3. The apparatus of any other embodiment, further comprising: a microwave power transmission antenna configured to transmit at least a portion of the power provided by the solar panel to a ground station.

4. The apparatus of any other embodiment, wherein the plurality of propellers are operable to maintain the solar panel in an orientation toward the sun.

5. The apparatus of any other embodiment, wherein the lighter-than-air gas comprises hydrogen gas.

6. The apparatus of any other embodiment, wherein the plurality of propellers are further operable to maintain the apparatus in a selected rotational orientation.

7. The apparatus of any other embodiment, further comprising a tank operable to contain a compressed form of the lighter-than-air gas.

8. The apparatus of any other embodiment, further comprising an inflation-measuring device that includes at least one lever arm configured to be angularly displaced by the quantity of the lighter-than-air gas in the flexible bladder.

9. The apparatus of any other embodiment, further comprising a plurality of flexible bladders.

10. The apparatus of any other embodiment, wherein a region of the apparatus disposed between the flexible bladder and the outer membrane is maintained at a pressure substantially equal to a pressure within the flexible bladder.

11. The apparatus of any other embodiment, further comprising control circuitry operable to maintain a region of the apparatus disposed between the flexible bladder and the outer membrane at a pressure selected to cause the flexible bladder to have a desired volume.

12. The apparatus of any other embodiment, wherein a region of the apparatus disposed between the flexible bladder and the outer membrane is maintained at a selected pressure, wherein the selected pressure is based on a diffusion rate of the lighter-than-air gas.

13. The apparatus of any other embodiment, further comprising a tail operable to orient the apparatus based on a wind direction.

14. The apparatus of any other embodiment, further comprising a rudder operable to steer the apparatus.

15. The apparatus of any other embodiment, further comprising a rigid core disposed within a central portion of the circular lenticular shape.

16. The apparatus of any other embodiment, further comprising at least one non-directional antenna.

17. The apparatus of any other embodiment, wherein the at least one non-directional antenna is an antenna configured to communicate with mobile phones.

18. The apparatus of any other embodiment, wherein the at least one non-directional antenna is a Long-Term Evolution (LTE) antenna.

19. The apparatus of any other embodiment, wherein the at least one non-directional antenna is a 3G antenna.

20. The apparatus of any other embodiment, wherein the at least one non-directional antenna is a Wi-Fi antenna.

21. The apparatus of any other embodiment, wherein the outer membrane is flexible.

22. The apparatus of any other embodiment, wherein the outer membrane is made of biaxially-oriented polyethylene terephthalate (BoPET).

23. The apparatus of any other embodiment, further comprising telecommunications circuitry coupled to the apparatus, wherein the apparatus is further operable to communicate via the telecommunications circuitry.

24. The apparatus of any other embodiment, wherein the plurality of structural members are rigid.

25. The apparatus of any other embodiment, wherein the plurality of structural members are non-rigid, tension members.

26 An apparatus, comprising: a central core portion; a flexible membrane wrapped around the central core portion; a plurality of structural members coupled to the flexible membrane; and a plurality of ring segments coupled to the flexible membrane; wherein: the plurality of ring segments are assemblable into a rigid ring disposed around a perimeter of the flexible membrane; the plurality of structural members are operable to form the flexible membrane in a selected shape; and wherein the apparatus is operable to float at a selected altitude.

27. The apparatus of any other embodiment, wherein the central core portion is cylindrical.

28. The apparatus of any other embodiment, wherein the flexible membrane includes a flexible solar panel coupled thereto.

29. The apparatus of any other embodiment, wherein the plurality of ring segments are embedded in the flexible membrane.

30. The apparatus of any other embodiment, wherein the plurality of structural members are non-rigid, tension elements.

31. The apparatus of any other embodiment, wherein the plurality of structural members are disposed radially in the selected shape.

32. The apparatus of any other embodiment, further comprising a flexible bladder disposed within the flexible membrane.

33. The apparatus of any other embodiment, wherein the flexible bladder is inflatable to cause expansion of the flexible membrane.

34. An apparatus, comprising: a lighter-than-air aircraft that includes: a plurality of propellers configured to maintain the apparatus at a selected geodetic position; and a directional antenna; wherein the directional antenna is configured to communicate with at least one other lighter-than-air aircraft that includes an other directional antenna.

35. The apparatus of any other embodiment, wherein the plurality of propellers is further configured to maintain the apparatus at a selected rotational orientation that aims the directional antenna at the other directional antenna.

36. The apparatus of any other embodiment, wherein the directional antenna is rotatable relative to the apparatus.

37. The apparatus of any other embodiment, wherein the lighter-than-air aircraft is configured to rotate the directional antenna in an orientation aimed at the other directional antenna.

38. The apparatus of any other embodiment, wherein the lighter-than-air aircraft includes a balloon.

39. The apparatus of any other embodiment, wherein the lighter-than-air aircraft is a balloon.

40. The apparatus of any other embodiment, wherein the lighter-than-air aircraft is an airship.

41. The apparatus of any other embodiment, wherein the lighter-than-air aircraft is a drone.

42. The apparatus of any other embodiment, wherein the directional antenna is an optical antenna.

43. The apparatus of any other embodiment, further comprising a radar unit.

44. A method, comprising: maintaining a lighter-than-air aircraft at a selected aerial geodetic position, wherein the lighter-than-air aircraft includes: a plurality of propellers; and a directional antenna; and causing, via the directional antenna, the lighter-than-air aircraft to communicate with at least one other lighter-than-air aircraft that includes an other directional antenna.

45. An apparatus, comprising: an outer membrane formed in a selected shape by a plurality of structural members; a flexible bladder within the outer membrane; and wherein the apparatus is operable to float at a selected altitude based on a quantity of lighter-than-air gas in the flexible bladder; and wherein a pressure of the lighter-than-air gas in the flexible bladder is substantially equal to a pressure of a gas in an interstitial space between the flexible bladder and the outer membrane.

46. The apparatus of any other embodiment, wherein the pressure of the lighter-than-air gas is within 5% of the pressure of the gas in the interstitial space.

47. The apparatus of any other embodiment, wherein the pressure of the gas in the interstitial space is selected such that the flexible bladder maintains a desired volume.

48. The apparatus of any other embodiment, further comprising telecommunications circuitry coupled to the apparatus.

49. An apparatus, comprising: an outer membrane formed in a selected shape by a plurality of structural members; a flexible bladder within the outer membrane; and at least one lever arm configured to be angularly displaced by a volume of lighter-than-air gas in the flexible bladder; wherein the apparatus is operable to float at a selected altitude based on a quantity of lighter-than-air gas in the flexible bladder.

50. The apparatus of any other embodiment, wherein a pivot point of the at least one lever arm is disposed at a central top portion of the apparatus.

51. The apparatus of any other embodiment, further comprising a tensioning member configured to resist the displacement of the at least one lever arm.

52. The apparatus of any other embodiment, further comprising a tensioning member configured to displace the at least one lever arm in a direction other than the displacement of the at least one lever arm by the volume of lighter-than-air gas in the flexible bladder.

53. The apparatus of any other embodiment, wherein the at least one lever arm comprises a plurality of lever arms.

54. The apparatus of any other embodiment, further comprising a potentiometer operable to measure the angular displacement of the at least one lever arm.

55. The apparatus of any other embodiment, further comprising control circuitry configured to adjust an inflation level of the flexible bladder based on the angular displacement.

56. The apparatus of any other embodiment, wherein the at least one lever arm is attached to the flexible bladder.

57. The apparatus of any other embodiment, wherein the at least one lever arm is not attached to the flexible bladder.

58. The apparatus of any other embodiment, further comprising telecommunications circuitry coupled to the apparatus.

59. An apparatus, comprising: an outer membrane formed in a selected shape by a plurality of structural members; a flexible bladder within the outer membrane; and an optical system configured to determine a volume of lighter-than-air gas in the flexible bladder; wherein the apparatus is operable to float at a selected altitude based on a quantity of lighter-than-air gas in the flexible bladder.

60. The apparatus of any other embodiment, wherein the optical system includes a laser configured to project light onto a portion of the flexible bladder.

61. The apparatus of any other embodiment, further comprising control circuitry configured to measure a delay time associated with the light.

62. The apparatus of any other embodiment, wherein the optical system includes a laser exterior to the outer membrane that is configured to project light onto a portion of the outer membrane.

63. The apparatus of any other embodiment, further comprising telecommunications circuitry coupled to the apparatus.

64. An apparatus, comprising: an outer membrane formed in a selected shape by a plurality of structural members; a flexible bladder within the outer membrane; a monitoring system configured to determine a volume of lighter-than-air gas in the flexible bladder; and control circuitry configured to adjust the volume of lighter-than-air gas in the flexible bladder based on the determined volume; wherein the apparatus is operable to float at a selected altitude based on a quantity of lighter-than-air gas in the flexible bladder.

65. The apparatus of any other embodiment, wherein the monitoring system includes at least one lever arm configured to be angularly displaced by the volume of lighter-than-air gas in the flexible bladder.

66. The apparatus of any other embodiment, wherein the monitoring system includes an optical ranging system configured to measure a position of at least a portion of the flexible bladder.

67. The apparatus of any other embodiment, wherein the optical ranging system is a laser ranging system.

68. The apparatus of any other embodiment, wherein the optical ranging system is a camera-based ranging system.

69. The apparatus of any other embodiment, further comprising telecommunications circuitry coupled to the apparatus.

70. An apparatus, comprising: an outer membrane formed in a selected shape by a plurality of structural members; a flexible bladder within the outer membrane; at least one directional antenna coupled to the apparatus; and a propeller coupled to the apparatus and operable to aim the at least one directional antenna in a selected direction; wherein the apparatus is operable to float at a selected altitude based on a quantity of lighter-than-air gas in the flexible bladder.

71. The apparatus of any other embodiment, further comprising a plurality of propellers coupled to the apparatus and operable to aim the at least one directional antenna in a selected direction.

72. The apparatus of any other embodiment, further comprising a vertical member operable to rotate the apparatus in response to airflow.

73. The apparatus of any other embodiment, wherein the vertical member is an airfoil.

74. The apparatus of any other embodiment, wherein the vertical member is a rudder, and wherein the apparatus further comprises control circuitry configured to change a position of the rudder.

75. The apparatus of any other embodiment, wherein the vertical member is a tail.

76. The apparatus of any other embodiment, further comprising telecommunications circuitry coupled to the at least one directional antenna.

77. An apparatus, comprising: an outer membrane formed in a selected shape by a plurality of structural members; a flexible bladder within the outer membrane; at least one solar panel coupled to the apparatus; and a propeller coupled to the apparatus and operable to aim the at least one solar panel in a desired direction; wherein the apparatus is operable to float at a selected altitude based on a quantity of lighter-than-air gas in the flexible bladder.

78. The apparatus of any other embodiment, wherein the desired direction is a direction that maximizes an amount of solar radiation incident on the at least one solar panel.

79. The apparatus of any other embodiment, further comprising control circuitry configured to alter the desired direction based on a time of day.

80. The apparatus of any other embodiment, further comprising a plurality of propellers coupled to the apparatus and operable to aim the at least one solar panel in a selected direction.

81. The apparatus of any other embodiment, further comprising a vertical member operable to rotate the apparatus in response to airflow.

82. The apparatus of any other embodiment, wherein the vertical member is an airfoil.

83. The apparatus of any other embodiment, wherein the vertical member is a rudder, and wherein the apparatus further comprises control circuitry configured to change a position of the rudder.

84. The apparatus of any other embodiment, wherein the vertical member is a tail.

85. An apparatus, comprising: an outer membrane formed in a selected shape by a plurality of structural members; a flexible bladder within the outer membrane; and telecommunications circuitry including at least one directional antenna coupled to the apparatus, wherein the at least one directional antenna is rotatable relative to the outer membrane; wherein the apparatus is operable to float at a selected altitude based on a quantity of lighter-than-air gas in the flexible bladder, and further operable to communicate via the telecommunications circuitry.

86. The apparatus of any other embodiment, further comprising a plurality of propellers coupled to the apparatus that are operable to rotate the apparatus to a selected rotational orientation.

87. The apparatus of any other embodiment, wherein the at least one directional antenna is operable to rotate based on the rotation of the apparatus.

88. The apparatus of any other embodiment, wherein the at least one directional antenna is operable to maintain a selected geodetic rotational orientation during rotation of the apparatus by the plurality of propellers.

89. The apparatus of any other embodiment, wherein the at least one directional antenna includes a plurality of directional antennas.

90. The apparatus of any other embodiment, wherein the plurality of directional antennas are independently rotatable relative to one another.

91. The apparatus of any other embodiment, wherein the plurality of directional antennas are maintained at fixed relative angles to one another.

92. The apparatus of any other embodiment, wherein the at least one directional antenna is coupled to the apparatus via a slip ring connection configured to transmit power to the at least one directional antenna.

93. The apparatus of any other embodiment, wherein the at least one directional antenna is coupled to the apparatus via a slip ring connection configured to transmit data to the at least one directional antenna.

94. The apparatus of any other embodiment, wherein the at least one directional antenna is operable to receive data from the apparatus via a local wireless connection.

95. The apparatus of any other embodiment, further comprising a tail operable to orient the apparatus based on a wind direction.

96. The apparatus of any other embodiment, wherein the at least one directional antenna is operable to maintain a selected geodetic rotational orientation during rotation of the apparatus by the tail.

97. The apparatus of any other embodiment, further comprising a solar panel.

98. The apparatus of any other embodiment, wherein the apparatus is configured to rotate based on a sun position.

99. The apparatus of any other embodiment, wherein the at least one directional antenna is operable to maintain a selected geodetic rotational orientation during rotation of the apparatus based on the sun position.

100. The apparatus of any other embodiment, wherein the at least one directional antenna is further operable to change a vertical orientation.

101. The apparatus of any other embodiment, wherein the at least one directional antenna is disposed below the outer membrane.

102. The apparatus of any other embodiment, wherein the telecommunications circuitry and the at least one directional antenna are mounted below the outer membrane via a hinged rigid, and wherein the hinged rigid member is configured to impart a torque to the outer membrane when actuated This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" or "operable" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "a microwave power transmission antenna configured to transmit power" is intended to cover, for example, an antenna that has circuitry that performs this function during operation, even if the antenna in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

Further, the term "configured to" is not intended to mean "configurable to." An unprogrammed FPGA, for example, would not be considered to be "configured to" perform some specific function, although it may be "configurable to" perform that function, and may be "configured to" perform that function after programming.

Reciting in the appended claims that a structure is "configured to" perform one or more tasks is expressly intended not to invoke 35 U.S.C. § 112(f) for that claim element. Accordingly, none of the claims in this application as-filed are intended to be interpreted as having means-plus-function elements. Should Applicant wish to invoke Section 112(f) during prosecution, it will recite claim elements using the "means for [performing a function]" construct.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A method comprising:
    providing an unmanned, lighter-than-air aircraft that includes:
        an outer membrane;
        a flexible bladder within the outer membrane;
        a region disposed between the outer membrane and the flexible bladder;
        a volume detection device;
        a region pressure adjustment device configured to adjust a pressure of the region; and
        pressure control circuitry configured to control the region pressure adjustment device based on measurements received from the volume detection device;
    causing the aircraft to float at a selected altitude of at least 60,000 feet above sea level based on a quantity of lighter-than-air gas in the flexible bladder;
    maintaining the aircraft at the selected altitude and measuring, via the volume detection device, a volume of the flexible bladder within the outer membrane; and
    adjusting, by the region pressure adjustment device receiving instructions from the pressure control circuitry and the pressure control circuitry receiving measurements from the volume detection device, the pressure of the region such that the volume of the flexible bladder is maintained at a desired volume less than a maximum volume of the flexible bladder and equalized with a pressure inside the flexible bladder, thereby reducing leakage of the lighter-than-air gas from the flexible bladder.

2. The method of claim 1, further comprising:
    powering the aircraft via a solar panel coupled thereto.

3. The method of claim 1, wherein the lighter-than-air gas comprises hydrogen gas.

4. The method of claim 1, wherein the aircraft further includes a plurality of flexible bladders and a corresponding plurality of volume detection devices, and wherein the method further comprises:
    measuring, via the corresponding volume detection device, volumes of the plurality of flexible bladders; and
    adjusting, by the region pressure adjustment device receiving instructions from the pressure control circuitry and the pressure control circuitry receiving measurement from the plurality of volume detection devices, the pressure of the region such that the volumes of the plurality of flexible bladders are maintained at desired volumes less than a maximum volume of each of the plurality flexible bladders and equalized with a pressure inside the flexible bladders, thereby reducing leakage of the lighter-than-air gas from the plurality of flexible bladders.

5. The method of claim 1, wherein the aircraft includes at least one non-directional antenna configured to communicate with mobile phones.

6. The method of claim 1, wherein the aircraft further includes a bladder pressure adjustment device configured to adjust the pressure of the flexible bladder, wherein the pressure control circuitry is further configured to control the bladder pressure adjustment device based on measurements received from the volume detection device, wherein the method further comprises:

adjusting, by the region pressure adjustment device and the bladder pressure adjustment device each receiving instructions from the pressure control circuitry and the pressure control circuitry receiving measurements from the volume detection device, the pressure of the region and the pressure of the flexible bladder such that the volume of the flexible bladder is maintained at the desired volume.

7. The method of claim 6, wherein the region pressure adjustment device comprises a compressor.

8. The method of claim 1, wherein the region pressure adjustment device comprises:

a source of compressed gas configured to provide gas to the region.

9. The method of claim 8, wherein the source of compressed gas comprises a compressor.

10. The method of claim 1, wherein the aircraft further includes a plurality of propellers operable to maintain the aircraft in a selected geodetic position.

11. The method of claim 1, wherein the volume detection device comprises:

a lever arm;
a tension element configured to press the lever arm against a surface of the flexible bladder; and
a potentiometer configured, based on a position of the lever arm, to measure the volume of the flexible bladder.

12. The method of claim 1, wherein the volume detection device comprises a laser measurement device configured to:

send an optical pulse to a surface of the flexible bladder; and
based on a delay time associated with the optical pulse, measure the volume of the flexible bladder.

13. The method of claim 1, wherein the pressure control circuitry is configured to determine a target volume as the desired volume of the flexible bladder based on the measurements received from the volume pressure detection device, and wherein the region pressure adjustment instructions correspond to the target volume.

14. A method comprising:

providing an unmanned, lighter-than-air aircraft that includes:
an outer membrane;
a flexible bladder within the outer membrane;
a region disposed between the outer membrane and the flexible bladder;
a volume detection device;
a bladder pressure adjustment device configured to adjust a pressure of the flexible bladder; and
pressure control circuitry configured to control the bladder pressure adjustment device based on measurements received from the volume detection device;

causing the aircraft to float at a selected altitude of at least 60,000 feet above sea level based on a quantity of lighter-than-air gas in the flexible bladder;

maintaining the aircraft at the selected altitude and measuring, via the volume detection device, a volume of the flexible bladder within the outer membrane; and adjusting, by the bladder pressure adjustment device receiving instructions from the pressure control circuitry and the pressure control circuitry receiving measurements from the volume detection device, the pressure of the flexible bladder such that the volume of the flexible bladder is maintained at a desired volume less than a maximum volume of the flexible bladder and equalized with a pressure of the region, thereby reducing leakage of the lighter-than-air gas from the flexible bladder.

15. The method of claim 14, wherein the volume detection device comprises:

a lever arm;
a tension element configured to press the lever arm against a surface of the flexible bladder; and
a potentiometer configured, based on a position of the lever arm, to measure the volume of the flexible bladder.

16. The method of claim 14, wherein the volume detection device comprises a laser measurement device configured to:

send an optical pulse to a surface of the flexible bladder; and
based on a delay time associated with the optical pulse, measure the volume of the flexible bladder.

17. The method of claim 14, further comprising the pressure control circuitry determining a target volume as the desired volume of the flexible bladder based on the measurements received from the volume detection device, and wherein the bladder pressure adjustment instructions correspond to the target volume.

18. The method of claim 14, wherein the bladder pressure adjustment device comprises:

a valve configured to release lighter-than-air gas from the flexible bladder; and
a source of compressed gas configured to provide lighter-than-air gas to the flexible bladder.

19. The method of claim 18, wherein the source of compressed gas comprises a tank containing a compressed form of the lighter-than-air gas.

* * * * *

UNITED STATES PATENT AND TRADEMARK OFFICE
CERTIFICATE OF CORRECTION

PATENT NO. : 10,367,447 B2
APPLICATION NO. : 14/971651
DATED : July 30, 2019
INVENTOR(S) : Michaelis, IV et al.

It is certified that error appears in the above-identified patent and that said Letters Patent is hereby corrected as shown below:

In the Claims

Column 18, Lines 54-55 please amend Claim 4 as follows:
4. The method of claim 1, wherein the aircraft further includes a plurality of flexible bladders and a corresponding plurality of volume detection devices, and wherein the method further comprises:
    measuring, via the corresponding volume detection device, volumes of the plurality of flexible bladders; and
    adjusting, by the region pressure adjustment device receiving instructions from the pressure control circuitry and the pressure control circuitry receiving measurements from the plurality of volume detection devices, the pressure of the region such that the volumes of the plurality of flexible bladders are maintained at a desired volumes less than a maximum volume of each of the flexible bladders and equalized with a pressure inside the flexible bladders, thereby reducing leakage of the lighter-than-air gas from the plurality of flexible bladders.

Column 19, Line 42 please amend Claim 13 as follows:
13. The method of claim 1, wherein the pressure control circuitry is configured to determine a target volume as the desired volume of the flexible bladder based on the measurements received from the volume detection device, and wherein the region pressure adjustment instructions correspond to the target volume.

Signed and Sealed this
Seventeenth Day of September, 2019

Andrei Iancu
*Director of the United States Patent and Trademark Office*